UNITED STATES PATENT OFFICE.

GEORGE W. WAITT, OF PHILADELPHIA, PENNSYLVANIA, ASSIGNOR TO NUTRIO MANUFACTURING COMPANY.

IMPROVEMENT IN PREPARING WHEAT AND OTHER CEREALS FOR FOOD.

Specification forming part of Letters Patent No. 128,342, dated June 25, 1872; reissue No. 5,105, dated October 15, 1872.

*To all whom it may concern:*

Be it known that I, GEORGE W. WAITT, of the city and county of Philadelphia and State of Pennsylvania, have invented a new and useful Method of Preparing Wheat and other Cereals for Food; and I do hereby declare the following to be a full, clear, and exact description of the same.

My invention has for its object to provide from wheat and other cereals a palatable and nutritious food, which shall contain less starch than is constituent in the grain, and to bring within easy reach of the consumer such a preparation of these grains, in the form of flour, meal, or broken kernels, as shall be wholesome and inviting, with little or no further cooking than that received by my treatment, which I will presently describe. A further object of my invention is to insure the better preservation of these cereals or their products from acidity, fermentation, and worms, especially in unfavorable climates and on shipboard. My invention has further for its object to retain all the nutritious elements of the grain, and in such form as not to disturb the most delicate stomach; and, further, to produce a greater amount of nutrition from any given quantity of grain subjected to my treatment than the same would yield ground and cooked by the ordinary methods.

To attain these results my invention consists in subjecting the ripe grain, either in the berry or kernel, or more or less comminuted, to such torrefication as shall convert more or less of the starch into dextrine and render the hull friable, so that subsequent grinding or comminuting shall break or pulverize the whole mass equally, thereby fitting the grain without waste, to be easily formed into flour, meal, grits, or cracked wheat.

The process of torrefication can be most conveniently conducted while the grain is in the kernel, in a suitable rotating cylinder, the degree of heat required being from 212° to 300° Fahrenheit.

After the above treatment I put up one article as fine flour, one as meal, another as coarse grits, and so on, in suitable packages, boxes, or incasements to best meet the convenience of the trade and the consumer.

Among the many advantages of the food prepared in accordance with my invention are the following: First, its adaptation for transportation and preservation; secondly, its great convenience for travelers and explorers; thirdly, its sanitary value, not only to the general public, but to armies in malarious districts, as a preventive of diarrhœa, dysentery, and other complaints often attendant upon exposure and change of climate; and, finally, the facility with which the food can be prepared for the table.

I am aware that parched corn is mentioned as an article of food in the Bible, but the preparation of cereal grains by my process, and the aftertreatment for the market, gives me a claim to the introduction of a new commercial article, and a desirable and economical food for the public.

What I claim, therefore, is—

As a new commercial article, flour, meal, or grits prepared from torrefied wheat and other cereals, substantially as described, and put up in packages for the market, for the purposes specified.

GEO. W. WAITT.

Witnesses:
E. C. MANN, Jr.,
C. ABBOTT RUGGLES.